United States Patent
Brignone et al.

(10) Patent No.: US 11,674,427 B2
(45) Date of Patent: Jun. 13, 2023

(54) HEATING DEVICE FOR AN EXHAUST SYSTEM OF AN INTERNAL COMBUSTION ENGINE

(71) Applicant: MARELLI EUROPE S.P.A., Corbetta (IT)

(72) Inventors: Mauro Brignone, Turin (IT); Marco La Sana, Turin (IT); Emanuele Milani, Sandigliano (IT); Stefano Rivella, Caluso (IT)

(73) Assignee: MARELLI EUROPE S.P.A., Corbetta (IT)

(*) Notice: Subject to any disclaimer, the term of this patent is extended or adjusted under 35 U.S.C. 154(b) by 0 days.

(21) Appl. No.: 17/552,988

(22) Filed: Dec. 16, 2021

(65) Prior Publication Data
US 2022/0195908 A1 Jun. 23, 2022

(30) Foreign Application Priority Data
Dec. 23, 2020 (IT) .................. 102020000032171

(51) Int. Cl.
*F01N 3/36* (2006.01)
*F01N 3/20* (2006.01)
(Continued)

(52) U.S. Cl.
CPC ............. *F01N 3/36* (2013.01); *F01N 3/0256* (2013.01); *F01N 3/2033* (2013.01); *F01N 3/32* (2013.01);
(Continued)

(58) Field of Classification Search
CPC ........ F01N 3/0256; F01N 3/2033; F01N 3/32; F01N 3/36; F01N 3/38; F01N 2240/14;
(Continued)

(56) References Cited

U.S. PATENT DOCUMENTS

| 4,651,524 A | * | 3/1987 | Brighton | F01N 3/032 60/303 |
| 5,140,814 A | * | 8/1992 | Kreutmair | F01N 3/025 60/303 |

(Continued)

FOREIGN PATENT DOCUMENTS

| DE | 4239079 A1 | 5/1994 |
| EP | 0631039 A1 | 12/1994 |

(Continued)

OTHER PUBLICATIONS

Search Report for Italian Patent Application No. 202000032171 dated Jun. 9, 2021.

*Primary Examiner* — Audrey B. Walter
(74) *Attorney, Agent, or Firm* — Howard & Howard Attorneys PLLC

(57) ABSTRACT

A heating device for an exhaust system of an internal combustion engine and having: a tubular body, where a combustion chamber is obtained on the inside; a fuel injector, which injects fuel into the combustion chamber; at least one inlet opening, which can be connected to a fan so as to receive an air flow, which is directed to the combustion chamber and gets mixed with the fuel; a feeding channel, which receives air from the inlet opening, surrounds an end portion of the fuel injector and ends with a nozzle, which is arranged around an injection point of the fuel injector; and a spark plug, which is mounted through a side wall of the tubular body so as to trigger the combustion of a mixture of air and fuel. The fuel injector is configured to spray at least 80% of the fuel against an inner surface of the feeding channel.

14 Claims, 3 Drawing Sheets

(51) Int. Cl.
  *F01N 3/32* (2006.01)
  *F01N 3/38* (2006.01)
  *F01N 3/02* (2006.01)
  *F01N 3/025* (2006.01)

(52) U.S. Cl.
  CPC ............ *F01N 3/38* (2013.01); *F01N 2240/14* (2013.01); *F01N 2240/20* (2013.01); *F01N 2250/04* (2013.01); *F01N 2340/02* (2013.01)

(58) Field of Classification Search
  CPC ............ F01N 2240/20; F01N 2250/04; F01N 2340/02
  See application file for complete search history.

(56) References Cited

U.S. PATENT DOCUMENTS

| | | |
|---|---|---|
| 5,417,059 A | 5/1995 | Hartel et al. |
| 7,140,874 B2 * | 11/2006 | Ingalls, Jr. ......... B01D 53/9495 431/185 |
| 8,006,487 B2 | 8/2011 | Gaiser |
| 2010/0154745 A1 * | 6/2010 | Gaiser .................... F23N 1/022 431/89 |
| 2011/0289906 A1 | 12/2011 | Morley et al. |

FOREIGN PATENT DOCUMENTS

| | | | |
|---|---|---|---|
| EP | 2713022 A1 | 4/2014 | |
| JP | 2005180371 A * | 7/2005 | ........... F01N 3/0256 |
| WO | 2012139801 A1 | 10/2012 | |

* cited by examiner

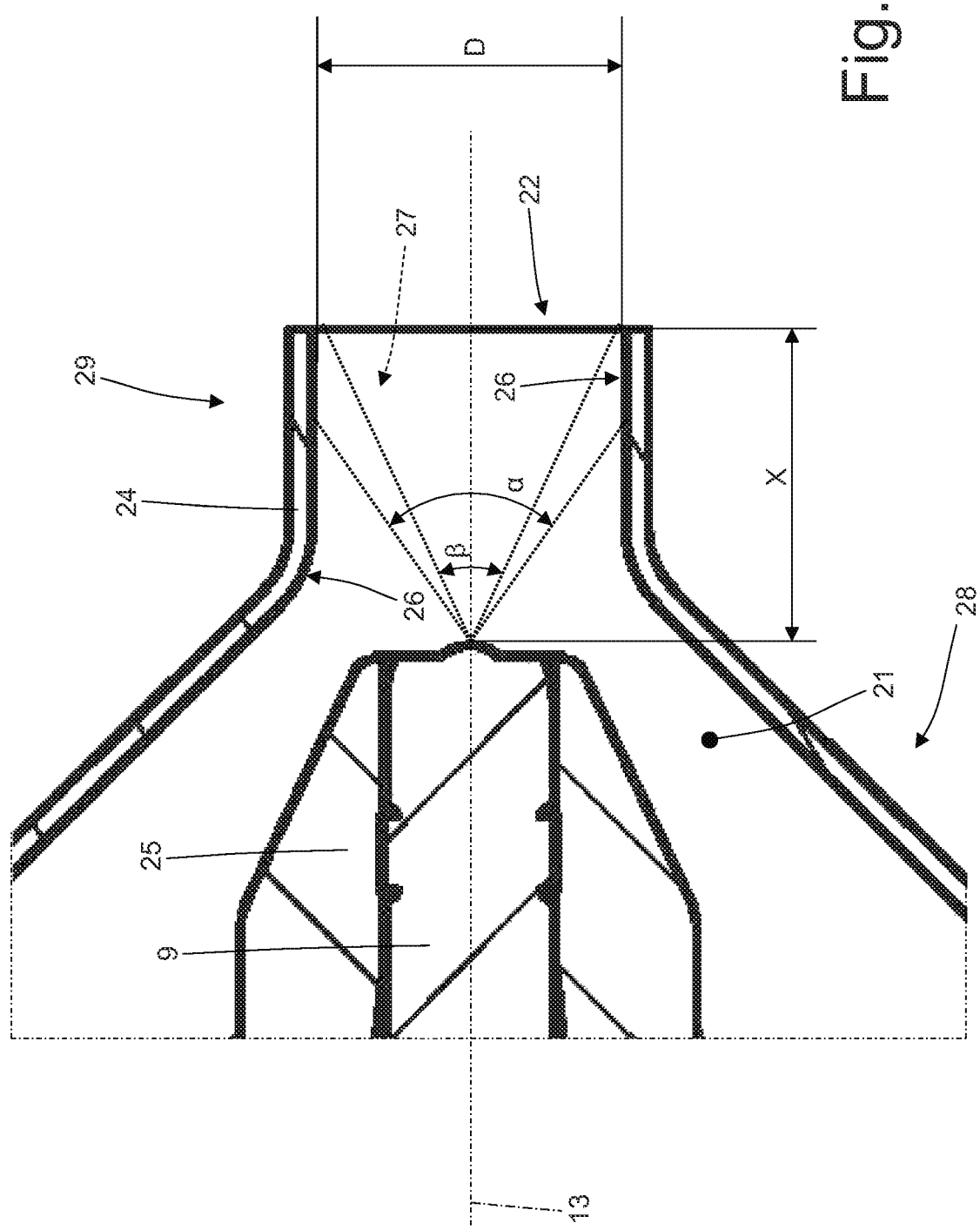

HEATING DEVICE FOR AN EXHAUST SYSTEM OF AN INTERNAL COMBUSTION ENGINE

CROSS-REFERENCE TO RELATED APPLICATIONS

This patent application claims priority from Italian patent application no. 102020000032171 filed on Dec. 23, 2020, the entire disclosure of which is incorporated herein by reference.

TECHNICAL FIELD

The invention relates to a heating device an exhaust system of an internal combustion engine.

BACKGROUND ART

An exhaust system of an internal combustion engine comprises an exhaust duct, along which there is installed at least one device for the treatment of the exhaust gases coming from the internal combustion engine; in particular, there always is a catalytic converter (either an oxidation catalytic converter or a reduction catalytic converter), to which a particulate filter can be added. The catalytic converter, in order to work (namely, in order to carry out a catalytic conversion), needs to operate at a relatively high operating temperature (a modern catalytic converter works at temperatures even close to 800° C.), since the chemical reactions for the conversion of unburnt hydrocarbons, nitrogen oxides and carbon monoxide into carbon dioxide, water and nitrogen take place only once the work temperature has been reached.

During a cold start phase (i.e. when the internal combustion engine is turned on after having been turned off for a long time, thus causing the temperature of the different components of the internal combustion engine to reach ambient temperature), the temperature of the catalytic converter remains, for a relatively long amount of time (even some minutes in winter and during a city travel, along which the internal combustion engine idles or runs very slow), significantly below the operating temperature. As a consequence, during the cold start phase, namely for the amount of time in which the catalytic converter has not reached its operating temperature yet, polluting emissions are very high, since the purification effect of the catalytic converter is close to zero or, anyway, is scarcely effective.

In order to speed up the reaching of the operating temperature of the catalytic converter, patent documents EP0631039A1, WO2012139801A1, U.S. Pat. No. 8,006,487B2, US2011289906A1 and EP2713022A1 suggest installing, along the exhaust duct, a heating device, which, by burning fuel, generates a (very) hot air flow, which flows through the catalytic converter. In particular, the heating device comprises a combustion chamber, which is connected, at the outlet, to the exhaust duct (immediately upstream of the catalytic converter) and is connected, at the inlet, to a fan, which generates an air flow flowing through the combustion chamber; in the combustion chamber there also are a fuel injector, which injects fuel to be mixed with air, and a spark plug, which cyclically produces sparks to ignite the air-fuel mixture in order to obtain the combustion that heats the air.

In known heating devices, the combustion of fuel is not always complete in all operating conditions and, therefore, it can happen (especially when a large quantity of fuel is injected in order to develop a large quantity of heat) that unburnt fuel reaches the exhaust duct and burns inside the exhaust duct, thus locally determining sudden, unexpected and undesired temperature rises.

DESCRIPTION OF THE INVENTION

The object of the invention is to provide a heating device for an exhaust system of an internal combustion engine, said heating device permitting a complete fuel combustion (namely without introducing unburnt fuel into the exhaust duct) and, furthermore, being simple and economic to be manufactured.

According to the invention, there is provided a heating device for an exhaust system of an internal combustion engine according to the appended claims.

The appended claims describe preferred embodiments of the invention and form an integral part of the description.

BRIEF DESCRIPTION OF THE DRAWINGS

The invention will now be described with reference to the accompanying drawings showing a non-limiting embodiment thereof, wherein:

FIG. 3 is a view, on a larger scale, of a detail of FIG. 2.

PREFERRED EMBODIMENTS OF THE INVENTION

Figure 1:
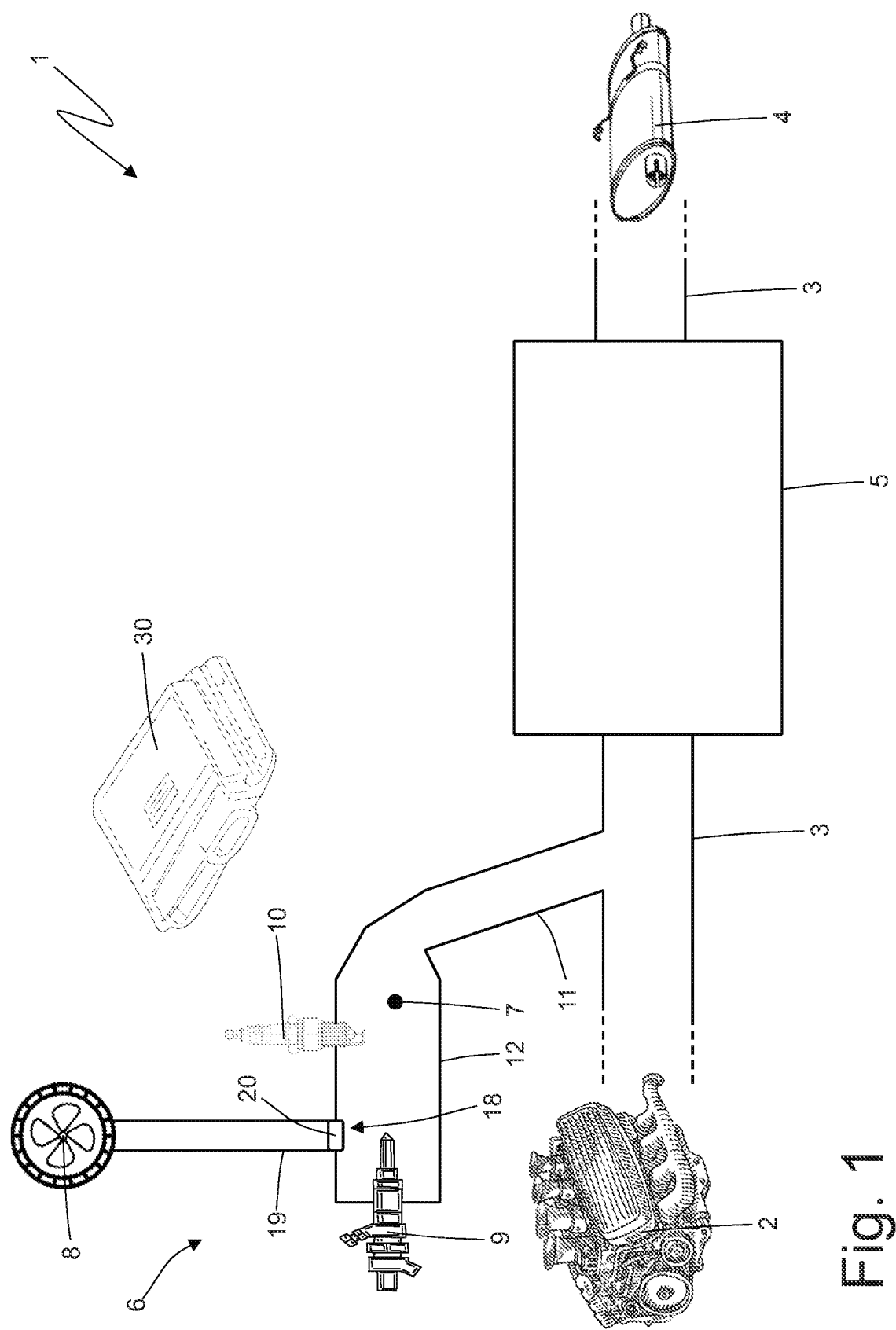
FIG. 1 is a schematic, partial view of an exhaust system of an internal combustion engine provided with a heating device according to the invention.

In FIG. 1, number 1 indicates, as a whole, an exhaust system of an internal combustion engine 2.

The exhaust system 1 comprises an exhaust duct 3, which originates from an exhaust manifold of the internal combustion engine 2 and ends with a silencer 4, from which exhaust gases are released into the atmosphere. Along the exhaust duct 3 there is installed at least one device 5 for the treatment of the exhaust gases coming from the internal combustion engine; in particular, there always is a catalytic converter (either an oxidation catalytic converter or a reduction catalytic converter), to which a particulate filter can be added. The catalytic converter, in order to work (namely, in order to carry out a catalytic conversion), needs to operate at a relatively high operating temperature (a modern catalytic converter works at temperatures even close to 800° C.), since the chemical reactions for the conversion of unburnt hydrocarbons, nitrogen oxides and carbon monoxide into carbon dioxide, water and nitrogen take place only once the work temperature has been reached.

In order to speed up the heating of the treatment device 5, namely in order to allow the treatment device 5 to reach its operating temperature more quickly, the exhaust system comprises a heating device 6, which, by burning fuel, generates a (very) hot air flow, which flows through the treatment device 5.

The heating device 6 comprises a combustion chamber 7, which is connected, at the outlet, to the exhaust duct 3 (immediately upstream of the treatment device 5) and is connected, at the inlet, to a fan 8 (namely, to an air pump), which generates an air flow flowing through the combustion chamber 7; in the combustion chamber 7 there also are a fuel injector 9, which injects fuel to be mixed with air, and a spark plug 10, which cyclically produces sparks to ignite the air-fuel mixture in order to obtain the combustion that heats the air. The combustion chamber 7 of the heating device 6 ends with an outlet duct 11, which leads into the exhaust duct 3 (immediately upstream of the treatment device 5).

Figure 2:
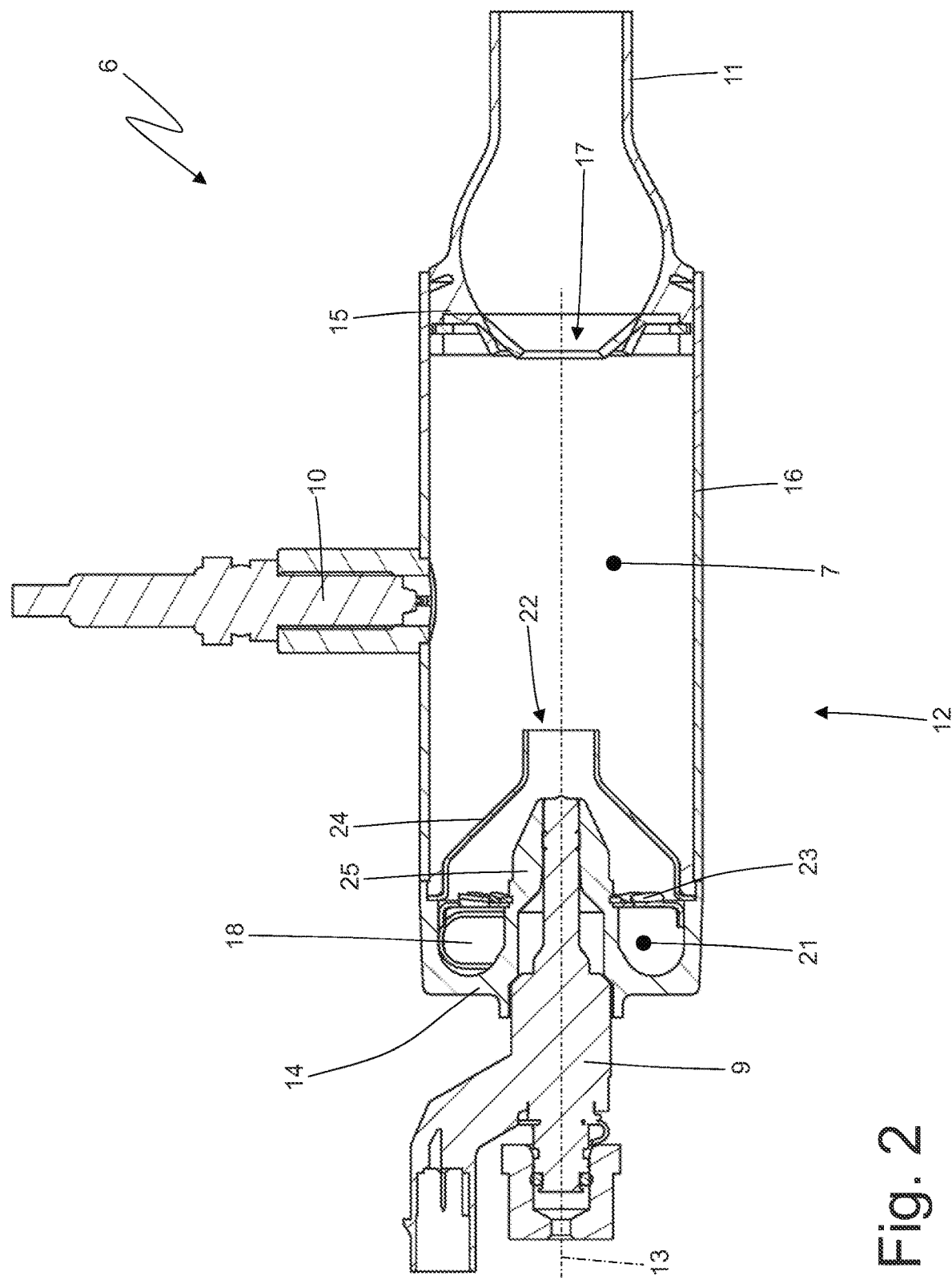
FIG. 2 is a schematic, longitudinal section view, with parts removed for greater clarity, of the heating device of FIG. 1.

According to FIG. 2, the heating device 6 comprises a tubular body 12 (for example, with a cylindrical shape and having a circular or elliptical cross section) having a longitudinal axis 13; the tubular body 12 is delimited, at the two ends, by two opposite base walls 14 and 15 and is laterally delimited by a side wall 16, which connects the two base walls 14 and 15 to one another. The base wall 14 is perforated at the centre so as to accommodate the injector 9, which is mounted coaxially to the tubular body 12 (namely, coaxially to the longitudinal axis 13); in other words, the fuel injector 9 is mounted through the base wall 14 of the tubular body 12 so as to inject fuel into the combustion chamber 7. Similarly, the base wall 15 is perforated at the centre so as to be fitted onto the outlet duct 11, which ends in the exhaust duct 3; namely, the base wall 15 has an outlet opening 17 to let hot air out of the combustion chamber 7 from which the outlet duct 11 originates.

According to FIG. 2, through the tubular body 12 there is obtained (at least) part of an inlet opening 18, which is connected to the fan 8 by means of an inlet duct 19 (shown in FIG. 1) in order to receive an air flow, which is directed towards the combustion chamber 7 and is mixed with the fuel injected by the fuel injector 9. Preferably, air flows into the inlet opening 18 with a flow that is oriented tangentially (relative to the tubular body 12), namely the inlet duct 19 is oriented tangentially (relative to the tubular body 12).

According to a possible, though non-binding embodiment shown in FIG. 1, in the area of the inlet opening 18 there is a non-return valve 20, which allows for an air flow only towards the combustion chamber 7 (namely, flowing into the tubular body 12). Preferably, the non-return valve 20 is passive (namely, does not comprise electric, hydraulic or pneumatic actuators generating a movement), is pressure-controlled and opens only when a pressure upstream of the non-return valve 20 is higher than a pressure downstream of the non-return valve 20. The function of the non-return valve 20 is that of preventing, when the heating device 6 is not used (namely, when the fan 8 is turned off), exhaust gases from flowing back until they flow out of the inlet opening 18 and, hence, are released into the atmosphere without going through the treatment device 5. Alternatively, the non-return valve 20 could be mounted along the outlet duct 11, for example in the area of the outlet opening 17; in this case, the non-return valve 20 allows air to only flow out of the combustion chamber 7 (out of the tubular body 12) towards the exhaust duct 3, namely it prevents exhaust gases from flowing from the exhaust duct 3 towards the combustion chamber 7 (into the tubular body 12).

According to FIG. 2, the heating device 6 comprises a feeding channel 21, which receives air from the inlet opening 18, surrounds an end portion of the fuel injector 9 and ends with a nozzle 22, which is arranged around an injection point of the fuel injector 9 (namely, around a spray tip of the fuel injector 9, from which fuel flows out).

The spark plug 10 is mounted through the side wall 16 of the tubular body 12 in order to trigger the combustion of an air and fuel mixture, which is obtained because of the mixing of air, which flows into the tubular body 12 from the inlet opening 18 and is introduced into the combustion chamber 7 by the nozzle 22 of the feeding channel 21, and fuel, which is injected into the combustion chamber 7 by the fuel injector 9. In particular, the side wall 16 of the tubular body 12 has a through hole, which is oriented radially (namely, perpendicularly to the longitudinal axis 13) and accommodates, on the inside (screwed into it), the spark plug 10 (which is obviously oriented radially).

The heating device 6 comprises a static mixer 23 (namely, without moving parts), which has the shape of an annulus, is arranged along the feeding channel 21 and around the fuel injector 9 and is configured to generate turbulences, in particular a swirling motion, in the air flowing towards the nozzle 22.

According to a preferred, though non-binding embodiment shown in the accompanying figures, downstream of the static mixer 23, the feeding channel 21 has a progressive reduction of the area of the cross section, so as to determine an increase in the air speed. In particular, downstream of the static mixer 23, the feeding channel 21 has an initial portion having a constant cross section area, an intermediate portion having a progressively decreasing cross section area and an end portion having a cross section area that is constant up to the nozzle 22.

The feeding channel 21 is delimited, on the outside, by an (at least partially conical) outer tubular body 24 and is delimited, on the inside, by an (at least partially conical) inner tubular body 25, which surrounds the fuel injector 9 and contains, on the inside, the fuel injector 9. Namely, the feeding channel 21 is defined between the inner tubular body 25 and the outer tubular body 24. In particular, the two tubular bodies 24 and 25 alternate conical portions (i.e. having a converging shape that progressively decreases its size) with cylindrical portions (i.e. having a shape with a constant size).

According to a preferred embodiment, air flows into the feeding channel 21 with a tangentially oriented flow so as to have a swirling motion (subsequently increased by the action of the static mixer 23), which helps it get mixed with the fuel injected by the fuel injector 9; in other words, the introduction of oxidizing air into the combustion chamber 7 through a duct oriented tangentially to the combustion chamber 7 allows the oxidizing air flow to gain a circular motion (further enhanced by the presence of the static mixer 23) so as to optimize the mixing of air and fuel inside the combustion chamber 7.

According to FIG. 3, the fuel injector 9 is configured to spray at least 80% (and preferably at least 90-95%, even up to 100%) of the fuel against an inner surface 26 of the feeding channel 21; namely, the fuel injector 9 does not directly direct the fuel towards the outside of the feeding channel 21, but, on the contrary, directs the fuel (basically the entirety of the fuel, namely 100% of the fuel) against the inner surface 26 of the feeding channel 21, so that all the fuel flowing out of the injector 9 preliminarily hits the inner surface 26 before flowing out of the feeding channel 21 through the nozzle 22. The impact of the fuel against the inner surface 26 allows the fuel droplets emitted by the injector 9 to be atomized in a very effective manner and, by so doing, the mixing of said fuel with the air flowing along the feeding channel 21 is significantly improved; an improvement in the mixing between air and fuel ensures an ideal and, especially, complete combustion of the fuel, thus preventing part of the unburnt fuel from flowing out of the combustion chamber 7.

According to a preferred embodiment, the injector 9 is configured to emit a fuel jet 27 having a centrally hollow conical shape, namely having a cross section shaped like an annulus, in which fuel gathers in the periphery; in particular, according to the embodiment shown in FIG. 3, an outer surface of the fuel jet 27 has an opening angle $\alpha$ of approximately 70° (for example, ranging between 65° and) 75° and an inner surface of the fuel jet 27 has an opening angle β of approximately 50° (for example, ranging from 45° to 55°). In other words, the injector 9 generates a fuel jet 27 having a conical shape (with the vertex of the cone close to the injection nozzle) and having, at the centre, a hole (namely, an area without fuel) also with a conical shape (with the vertex of the cone close to the injection nozzle); hence, the fuel jet 27 generated by the injector 9 has the shape of a conical shell due to the presence of the central hole, namely has an internally hollow conical shape.

As mentioned above, the feeding channel 21 is delimited, on the outside, by the outer tubular body 24 (having the inner surface 26 of the feeding channel 21) and is delimited, on the inside, by the inner tubular body 25, which surrounds the fuel injector 9 and contains, on the inside, the fuel injector 9. The outer tubular body 24 comprises a conical portion 28, which reduces its size towards the nozzle 22; furthermore, according to a preferred embodiment shown in the accompanying figures, the outer tubular body 24 also comprises a cylindrical portion 29, which is arranged downstream of the conical portion 28 and ends with the nozzle 22. According to a different embodiment which is not shown herein, the outer tubular body 24 has no cylindrical portion 29 and, therefore, comprises the sole conical portion 28. According to a further embodiment which is not shown herein, the cylindrical portion 29 could be replaced by a further conical portion having a smaller taper (convergence) than a taper (convergence) of the conical portion 28.

In the embodiment shown in the accompanying figures, the fuel injector 9 is configured to spray at least part of the fuel against the cylindrical portion 29 (or against the further conical portion) of the outer tubular body 24; in particular, the fuel injector 9 is configured to spray the largest part (almost the entirety, basically the entirety, namely 100%) of the fuel against the cylindrical portion 29 (or against the further conical portion) of the outer tubular body 24. According to a different embodiment, the fuel injector 9 is configured to spray at least part of the fuel against the cylindrical portion 29 (or against the further conical portion) of the outer tubular body 24 and at least part of the fuel against the conical portion 28 of the outer tubular body 24; for example, the fuel injector 9 is configured to spray approximately half the fuel against the conical portion 28 of the outer tubular body 24 and approximately half the fuel against the cylindrical portion (or against the further conical portion) of the outer tubular body 24. According to a further embodiment, the fuel injector 9 is configured to spray at least part of the fuel against the conical portion 28 of the outer tubular body 24; in particular, the fuel injector 9 is configured to spray the largest part (almost the entirety) of the fuel against the conical portion 28 of the outer tubular body 24.

According to FIG. 3, the nozzle 22 of the feeding channel 21 has a circular shape and has a diameter D, which ranges from 50% to 110%, preferably from 60% to 100%, of an axial distance X (namely, measured along the longitudinal axis 13) between the injection point of the fuel injector 9 and the nozzle 22. In other words, the nozzle 22 of the feeding channel 21 has a circular shape and has the diameter D, which is larger than 50%, preferably 60%, of the axial distance X between the injection point of the fuel injector 9 and the nozzle 22; namely, the axial distance X between the injection point of the fuel injector 9 and the nozzle 22 is smaller than 200%, preferably 170%, of the diameter of the nozzle 22 of the feeding channel 21. As a consequence, the cylindrical portion 29 (which is the end portion) of the tubular body 24, against which the fuel is sprayed, has a high ratio between diameter and axial length (namely, measured along the longitudinal axis 13) and, hence, the fuel spray 27 must have a large opening angle α (approximately 70°, hence much larger than 45°) in order to spray the largest part of the fuel against the inner surface 26 of the feeding channel 21 and, in particular, against the cylindrical portion 29 (which is the end portion) of the tubular body 24.

According to a preferred embodiment, the heating device 6 comprises a control unit 30 (schematically shown in FIG. 1), which is configured to control the entire operation of the heating device 6, namely to control the fan 8, the injector 9 and the spark plug 10 in a coordinated manner so as to reach, as efficiently and effectively as possible, the desired object (namely, quickly heating the treatment device 5 without damaging the treatment device 5 due to an excess temperature).

The embodiments described herein can be combined with one another, without for this reason going beyond the scope of protection of the invention.

The heating device 6 described above has numerous advantages.

First of all, the heating device 6 described above ensures, in all operating conditions (especially when a large quantity of fuel is injected in order to develop a large quantity of heat), a complete fuel combustion (namely, without introducing unburnt fuel into the exhaust duct 3) thanks to an ideal mixing between the oxidizing air introduced by the nozzle 22 of the feeding channel 21 and the fuel injected by the fuel injector 9.

Furthermore, the heating device 6 described above has a high thermal power in relation to its overall dimensions; namely, even though it is relatively small, the heating device 6 described above generates a high thermal power.

Finally, the heating device 6 described above is simple and economic to be manufactured, since it consists of a few parts with a non-complicated shape and easy to be joined with standard welds and joints.

LIST OF THE REFERENCE NUMBERS OF THE FIGURES 1 exhaust system
2 internal combustion engine
3 exhaust duct
4 silencer
5 treatment device
6 heating device
7 combustion chamber
8 fan
9 fuel injector
10 spark plug
11 outlet duct
12 tubular body
13 longitudinal axis
14 base wall
15 base wall
16 side wall
17 outlet opening
18 inlet opening
19 inlet duct
20 non-return valve
21 feeding channel
22 nozzle
23 static mixer
24 conical outer tubular body
25 conical inner tubular body 26 inner surface
27 fuel jet
28 conical portion
29 cylindrical portion
30 control unit
α angle
β angle
D diameter
X distance

The invention claimed is:

1. A heating device (6) for an exhaust system (1) of an internal combustion engine (2); the heating device (6) comprises:
 a tubular body (12), where a combustion chamber (7) is obtained on the inside;
 a fuel injector (9), which is mounted through a base wall (14) of the tubular body (12) so as to inject fuel into the combustion chamber (7);
 at least one inlet opening (18), which can be connected to a fan (8) so as to receive an air flow, which is directed to the combustion chamber (7) and gets mixed with the fuel;
 a feeding channel (21), which is delimited, on the outside, by an outer tubular body (24) having an inner surface (26), receives air from the inlet opening (18), surrounds an end portion of the fuel injector (9) and ends with a nozzle (22) comprising a circular outlet, which is arranged around an injection point of the fuel injector (9); and
 a spark plug (10), which is mounted through a side wall (16) of the tubular body (12) so as to trigger the combustion of a mixture of air and fuel;
 wherein the outer tubular body (24) comprises a conical portion (28), which reduces its size towards the nozzle (22);
 wherein the fuel injector (9) is configured to spray at least 80% of the fuel against the inner surface (26) of the outer tubular body (24) of the feeding channel (21) and is configured to spray at least part of the fuel against the conical portion (28) of the outer tubular body (24).

2. The heating device (6) according to claim 1, wherein the injector (9) is configured to spray at least 90% of the fuel against the inner surface (26) of the feeding channel (21).

3. The heating device (6) according to claim 1, wherein the injector (9) is configured to emit a fuel spray (27) having a conical shape hollow at the centre, namely having a cross section shaped like an annulus.

4. The heating device (6) according to claim 3, wherein an outer surface of the fuel spray (27) has an opening angle (α) of approximately 70° and an inner surface of the fuel spray (27) has an opening angle (β) of approximately 50°.

5. The heating device (6) according to claim 1, wherein the feeding channel (21) is delimited, on the inside, by an inner tubular body (25), which surrounds the fuel injector (9) and contains, on the inside, the fuel injector (9).

6. The heating device (6) according to claim 5, wherein:
 the outer tubular body (24) comprises a cylindrical portion (29), which is arranged downstream of the conical portion (28) and ends with the nozzle (22); and
 the fuel injector (9) is configured to spray at least part of the fuel against the cylindrical portion (29) of the outer tubular body (24).

7. The heating device (6) according to claim 1, wherein:
 the outer tubular body (24) comprises a cylindrical portion (29), which ends with the nozzle (22); and
 the fuel injector (9) is configured to spray at least part of the fuel against the cylindrical portion (29) of the outer tubular body (24).

8. The heating device (6) according to claim 1 and comprising a static mixer (23), which is shaped like an annulus, is arranged along the feeding channel (21) and around the fuel injector (9) and is configured to generate turbulences, in particular a swirling motion, in the air flowing towards the nozzle (22).

9. The heating device (6) according to claim 1, wherein air flows into the inlet opening (18) with a tangentially oriented flow.

10. The heating device (6) according to claim 1, wherein the nozzle (22) of the feeding channel (21) has a circular shape and has a diameter (D), which ranges from 50% to 110% of an axial distance (X) between the injection point of the fuel injector (9) and the nozzle (22).

11. The heating device (6) according to claim 1, wherein the nozzle (22) of the feeding channel (21) has a circular shape and has a diameter (D), which is larger than 50% of an axial distance (X) between the injection point of the fuel injector (9) and the nozzle (22).

12. The heating device (6) according to claim 1, wherein an axial distance (X) between the injection point of the fuel injector (9) and the nozzle (22) is smaller than 200% of a diameter of the nozzle (22) of the feeding channel (21).

13. An exhaust system (1) for an internal combustion engine (2); the exhaust system (1) comprises:
 an exhaust duct (3), which originates from an exhaust manifold of the internal combustion engine (2) and ends with a silencer (4), from which exhaust gases are released into the atmosphere;
 an exhaust gas treatment device (5), which is arranged along the exhaust duct (3); and
 the heating device (6) of claim 1, which is connected to the exhaust duct (3) upstream of the treatment device (5), and is designed to generate, by burning fuel, a hot air flow.

14. A heating device (6) for an exhaust system (1) of an internal combustion engine (2); the heating device (6) comprises:
 a tubular body (12), where a combustion chamber (7) is obtained on the inside;
 a fuel injector (9), which is mounted through a base wall (14) of the tubular body (12) so as to inject fuel into the combustion chamber (7);
 at least one inlet opening (18), which can be connected to a fan (8) so as to receive an air flow, which is directed to the combustion chamber (7) and gets mixed with the fuel;
 a feeding channel (21), which is delimited, on the outside, by an outer tubular body (24) having an inner surface (26), receives air from the inlet opening (18), surrounds an end portion of the fuel injector (9) and ends with a nozzle (22), which is arranged around an injection point of the fuel injector (9); and
 a spark plug (10), which is mounted through a side wall (16) of the tubular body (12) so as to trigger the combustion of a mixture of air and fuel;
 wherein the outer tubular body (24) comprises a conical portion (28), which reduces its size towards the nozzle (22) and a cylindrical portion (29), which is arranged downstream of the conical portion (28) and ends with the nozzle (22); and
 wherein the fuel injector (9) is configured to spray at least 80% of the fuel against the inner surface (26) of the outer tubular body (24) of the feeding channel (21) and is configured to spray at least part of the fuel against the cylindrical portion (29) of the outer tubular body (24).

\* \* \* \* \*